US008826294B2

(12) United States Patent
Mantor et al.

(10) Patent No.: US 8,826,294 B2
(45) Date of Patent: Sep. 2, 2014

(54) EFFICIENT STATE MANAGEMENT SYSTEM

(75) Inventors: Michael Mantor, Orlando, FL (US); Rex Eldon McCrary, Oviedo, FL (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 1057 days.

(21) Appl. No.: 12/341,028

(22) Filed: Dec. 22, 2008

(65) Prior Publication Data
US 2009/0172677 A1 Jul. 2, 2009

Related U.S. Application Data

(60) Provisional application No. 61/016,746, filed on Dec. 26, 2007.

(51) Int. Cl.
*G06F 9/455* (2006.01)
*G06F 9/46* (2006.01)

(52) U.S. Cl.
USPC .......................................................... 718/108

(58) Field of Classification Search
None
See application file for complete search history.

(56) References Cited

U.S. PATENT DOCUMENTS

| | | | |
|---|---|---|---|
| 5,920,326 A | 7/1999 | Rentschler et al. | |
| 6,091,422 A | 7/2000 | Ouaknine et al. | |
| 6,141,725 A | 10/2000 | Tucker et al. | |
| 6,343,309 B1 | 1/2002 | Clarke et al. | |
| 6,411,301 B1 * | 6/2002 | Parikh et al. | 345/522 |
| 6,421,058 B2 * | 7/2002 | Parikh et al. | 345/522 |
| 6,424,348 B2 * | 7/2002 | Parikh et al. | 345/522 |
| 6,452,600 B1 * | 9/2002 | Parikh et al. | 345/522 |
| 6,462,743 B1 | 10/2002 | Battle | |
| 2007/0103475 A1 | 5/2007 | Huang et al. | |

FOREIGN PATENT DOCUMENTS

| | | |
|---|---|---|
| CN | 101057261 A | 10/2007 |
| GB | 2420261 | 5/2006 |
| JP | 08-328951 A | 12/1996 |
| JP | 10-111858 A | 4/1998 |
| JP | 11-345349 A | 12/1999 |
| JP | 2001-076179 A | 3/2001 |
| JP | 2001-236221 A | 8/2001 |
| WO | WO 02101649 | 12/2002 |
| WO | WO 2006/051330 A1 | 5/2006 |
| WO | WO 2006/068985 A2 | 6/2006 |

OTHER PUBLICATIONS

Search Report and Written Opinion for International Appl. No. PCT/US2008/014011, Mailed on Apr. 16, 2009, 14 pages.
English language Abstract of Japanese Patent Publication No. 2001-076179 A, Japanese Patent Office, Patent & Utility Model Gazette DB, Patent Abstract of Japan, (2001) (listed on accompanying form PTO/SB/08A as FP3).

(Continued)

*Primary Examiner* — Corey S Faherty
(74) *Attorney, Agent, or Firm* — Sterne, Kessler, Goldstein & Fox P.L.L.C.

(57) ABSTRACT

The present invention provides an efficient state management system for a complex ASIC, and applications thereof. In an embodiment, a computer-based system executes state-dependent processes. The computer-based system includes a command processor (CP) and a plurality of processing blocks. The CP receives commands in a command stream and manages a global state responsive to global context events in the command stream. The plurality of processing blocks receive the commands in the command stream and manage respective block states responsive to block context events in the command stream. Each respective processing block executes a process on data in a data stream based on the global state and the block state of the respective processing block.

20 Claims, 4 Drawing Sheets

(56) References Cited

OTHER PUBLICATIONS

English-Language Abstract for Japanese Patent Publication No. 2001-236221 A, published Aug. 31, 2001; 1 page.
English-Language Translation of Notification of Reason(s) for Refusal directed to related Japanese Patent Application No. 2010-540662, mailed Jan. 16, 2013; 3 pages.
Office Action in Chinese Patent Application No. 2008/80122341.9, Chinese Patent Office, 6 pages, Beijing, China.
English translation of Office Action in Chinese Patent Application No. 2008/80122341.9, 9 pages (translation of document NPL1).
English language Abstract of Chinese Patent Publication No. CN 101057261, State Intellectual Property Office of the P.R.C. (SIPO), Beijing, China (listed on the accompanying form PTO/SB/08a as FPI).

\* cited by examiner

| # | State Writes | Pipeline (Stream) Input | GPU GMD Bit | GPU BMD Bit | GBL State Id | BlkA Dirty/Event | BlkA State Id |
|---|---|---|---|---|---|---|---|
| 1 | Block State | | 1 | 1 | 0 | 1/1 | 0 |
| 2 | Global State | | 1 | 1 | 0 | 1/1 | 0 |
| 3 | | vtx/pix vectors | 1 | 1 | 0 | 1/1 | 0 |
| 4 | Draw Initiator in Ctx 0 | Ctx Done Event | 0 | 0 | 0 | 0 | 0 |
| 5 | Global_Context_Done | | 0 | 0 | 0 | 0 | 0 |
| 6 | Write GBL_COPY_STATE | | 1 | 0 | 1 | 0 | 0 |
| 7 | Global State | | 1 | 0 | 1 | 0 | 0 |
| 8 | | vtx/pix vectors | 0 | 0 | 1 | 0 | 0 |
| 9 | Draw Initiator in Ctx 1 | Blk Ctx Done Event | 0 | 1 | 1 | 0/1 | 1 |
| 10 | Block State (Includes BlkA State) | | 1 | 1 | 1 | 1/1 | 1 |
| 11 | Global_Context_Done | Ctx Done Event | 1 | 1 | 1 | 1/1 | 1 |
| 12 | Write GBL_COPY_STATE | | 1 | 1 | 2 | 1/1 | 1 |
| 13 | Global State | | 1 | 1 | 2 | 1/1 | 1 |
| 14 | Draw Initiator in Ctx 2 | vtx/pix vectors | 0 | 0 | 2 | 0 | 1 |
| 15 | Block_Context_Done | Blk Ctx Done Event | 0 | 1 | 2 | 0/1 | 1 |
| 16 | Block State (No BlkA State) | | 0 | 1 | 2 | 0/1 | 1 |
| 17 | Draw Initiator in Ctx 2 | vtx/pix vectors | 0 | 0 | 2 | 0 | 1 |

FIG. 4

EFFICIENT STATE MANAGEMENT SYSTEM

CROSS REFERENCE TO RELATED APPLICATIONS

This application claims benefit under 35 U.S.C. §119(e) to U.S. Provisional Patent Application 61/016,746, entitled "Efficient State Management System," to Mantor et al., filed on Dec. 26, 2007, the entirety of which is hereby incorporated by reference as if fully set forth herein.

BACKGROUND OF THE INVENTION

1. Field of the Invention

The present invention is generally directed to computing operations performed in computer systems.

2. Background Art

A graphics processing unit (GPU) is an application-specific integrated circuit (ASIC) that is specially designed to perform graphics processing tasks. A GPU may, for example, execute graphics processing tasks required by an end-user application, such as a video game application. In such an example, there are several layers of software between the end-user application and the GPU. The end-user application communicates with an application programming interface (API). An API allows the end-user application to output graphics data and commands in a standardized format, rather than in a format that is dependent on the GPU. Several types of APIs are commercially available, including DirectX® developed by Microsoft Corp. and OpenGL® developed by Silicon Graphics, Inc. The API communicates with a driver. The driver translates standard code received from the API into a native format of instructions understood by the GPU. The driver is typically written by the manufacturer of the GPU. The GPU then executes the instructions from the driver.

Many GPUs include graphics pipelines to execute the instructions. A graphics pipeline includes a plurality of processing blocks that work on different steps of an instruction at the same time. Pipelining enables a GPU to take advantage of parallelism that exists among the steps needed to execute the instruction. As a result, a GPU can execute more instructions in a shorter period of time.

The output of the graphics pipeline is dependent on the state of the graphics pipeline. The state of a graphics pipeline is updated based on state packages—i.e., context-specific constants (such as texture handles, shader constants, transform matrices, etc.) that are locally stored by the graphics pipeline. Because the context-specific constants are locally maintained, they can be quickly accessed by the graphics pipeline.

The number of state packages maintained by the graphics pipeline depends on the API to which the GPU is coupled. The state packages associated with conventional APIs can be stored in a relatively small number of registers, such as eight registers. Unlike conventional APIs, however, newer APIs (such as DirectX® 10) require a relatively large number of frequent context switches with respect to certain aspects of the pipeline. The number of state packages associated with these frequent context switches cannot be supported by the relatively small number of registers maintained by conventional graphics pipelines.

A potential solution for handling the larger number of state packages associated with newer APIs is to simply increase the number of state packages supported by the graphics pipeline. However, this solution would significantly increase die area because additional registers would be required to handle the additional state packages. In addition, this solution could create timing issues because the graphics pipeline would stall if the number of state packages exceeds the storage capacity of the pipeline.

Another potential solution would be to attempt to compensate for the increased number of state packages using software. For example, the driver or the end-user application could attempt to re-order work sent to the GPU to reduce the number of state changes (increase work sent per state change). This solution, however, has at least two drawbacks. First, this solution will only work with some workloads (some inherently have too many state changes). Second, it significantly increases the workload of the CPU to search and sort input transactions.

Given the foregoing, what is needed is a method and system that provide an efficient state management system.

BRIEF SUMMARY OF THE INVENTION

The present invention meets the above-identified needs by providing an efficient state management system, and applications thereof.

In accordance with an embodiment of the present invention there is provided a computer-based system for executing state-dependent processes. The computer-based system includes a command processor and a plurality of processing blocks. The command processor receives commands in a command stream and manages a global state responsive to global context events in the command stream. The plurality of processing blocks receive the commands in the command stream and manage respective block states responsive to block context events in the command stream. The plurality of processing blocks execute processes on data in a data stream based on the global state and the block state of the respective processing blocks.

In accordance with another embodiment of the present invention there is provided a method for executing state-dependent processes in an ASIC. The method includes managing a global state of the ASIC responsive to global context events in a command stream and individually managing a block state of each processing block in a plurality of processing blocks responsive to block context events in the command stream. The plurality of processing blocks execute processes on data in a data stream based on the global state and the block state of the respective processing blocks.

In a further embodiment of the present invention there is provided a tangible computer readable storage medium that includes an ASIC embodied in software, wherein the ASIC executes state-dependent processes. The ASIC includes a command processor and a plurality of processing blocks. The command processor receives commands in a command stream and manages a global state responsive to global context events in the command stream. The plurality of processing blocks receive the commands in the command stream and manage respective block states responsive to block context events in the command stream. The plurality of processing blocks execute processes on data in a data stream based on the global state and the block state of the respective processing blocks.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 4 depicts a table illustrating management of a global-state and a block-state in accordance with an embodiment of the present invention.

Figure 1:
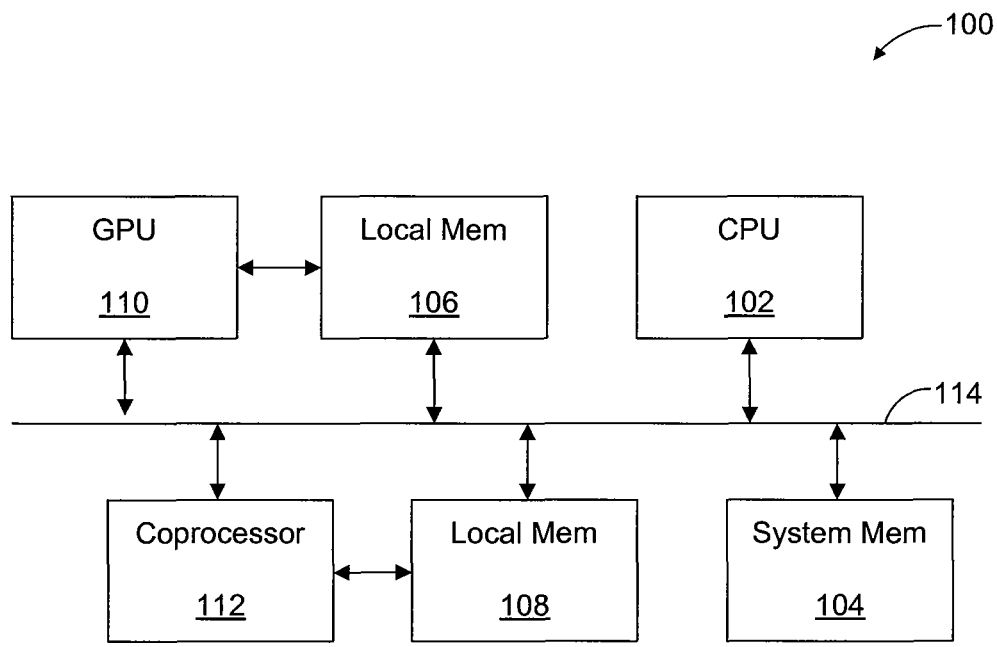
FIG. 1 depicts a block diagram illustrating an example system that includes a GPU in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Overview

The present invention provides an efficient state management system for a complex ASIC, and applications thereof. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For illustrative purposes, and not limitation, an efficient state management system in accordance with an embodiment of the present invention is described herein in terms of a GPU that executes a stream of draw commands based on a global state and block states of a graphics pipeline of the GPU. It is to be appreciated, however, that such an efficient state management system is applicable to other types of systems that execute a stream of commands based on the state of the respective systems. Based on the description contained herein, a person skilled in the relevant art(s) will understand how to implement embodiments of the present invention in such other types of systems.

As mentioned above, an efficient state management system in accordance with an embodiment of the present invention independently manages a global state and block states of a graphics pipeline. The global state comprises a predetermined number of possible global states, such as, for example, eight possible global states. The block states each comprise a predetermined number of possible block states, such as, for example, two, four, eight, sixteen, thirty-two, sixty-four, or some other number of possible block states. The number of possible block states may be different for each block. The global state may correspond to draw constants associated with features depicted in a scene that do not change frequently, such as, for example, the direction of sunlight in the scene. The block states may correspond to draw constants associated with features depicted in the scene that change frequently, such as, for example, the direction that grass blows as a result of wind depicted in the scene.

As used herein, the term "block" refers to a processing module included in an ASIC, an execution pipeline of a CPU, and/or a graphics pipeline of a GPU. Such a processing module may include, but is not limited to, an arithmetic logic unit, a multiply/divide unit, a floating point unit, a color buffer, a vertex shader, a pixel shader, a clipping unit, a z-buffer, or some other processing module as would be apparent to a person skilled in the relevant art(s).

Because a graphics pipeline in accordance with an embodiment of the present invention independently manages a global state and block states, such a graphics pipeline can execute a draw command that is based on a greater number of different values compared to a conventional graphics pipeline. For example, a conventional graphics pipeline can typically execute a draw command based on up to 8 different values. In contrast, a graphics pipeline in accordance with an embodiment of the present invention can execute a draw command based on up to, for example, 256 different values.

The global state is managed by a command processor (CP). The CP maintains a global-state dirty bit and a global-state identification (ID) bit. The global-state dirty bit indicates whether the global state of the graphics pipeline should be updated. The global-state ID bit indicates the global state of the graphics pipeline. The global-state ID bit is incremented after a global context event. A global context event is an event in an input (data) stream (such as a data packet) that indicates that the global state is to be updated. The global-state dirty bit is cleared on a draw call.

The block states are managed by the respective blocks of the graphics pipeline. Each block in the graphics pipeline maintains a block-state dirty bit and a block-state ID bit. The block-state dirty bit indicates whether the block state of a block should be updated. The block-state ID bit corresponding to a block indicates the block state of that block. The block-state ID bit of a block is incremented on a block context event if a next block-state update corresponds to that block. A block context event is an event in the input (data) stream (such as a data packet) that indicates that a block state is to be updated. In an embodiment, a block in the graphics pipeline determines that the next block state update corresponds to that block based on an address range of the next block state update. Similar to the global-state dirty bit, the block-state dirty bit is cleared on a draw call.

An efficient state management system can be couched in a computer system that includes a GPU. An example hardware implementation of such an efficient state management system, and the operation thereof, is described in more detail below. Software implementations of such an efficient state management system are also described.

II. An Example Hardware Implementation of an Efficient State Management System

As mentioned above, an efficient state management system in accordance with an embodiment of the present invention may be implemented in an ASIC that executes a stream of commands. For illustrative purposes, and not limitation, such an efficient state management system is described in terms of an example graphics pipeline that is included in a computer system, as described in more detail below.

A. Overview of Example Computer System

FIG. 1 is a block diagram of a computer system 100 according to an embodiment. System 100 includes a central processing unit (CPU) 102, a graphics processing unit (GPU) 110, and may optionally include a coprocessor 112. In addition, computer system 100 includes a system memory 104 that may be accessed by CPU 102, GPU 110, and coprocessor 112. GPU 110 and coprocessor 112 communicate with CPU 102 and the system memory over a bus 114. Bus 114 may be any type of bus used in computer systems, including, but not limited to, a peripheral component interface (PCI) bus, an accelerated graphics port (AGP) bus, and a PCI Express (PCIE) bus. GPU 110 and coprocessor 112 assist CPU 102 by performing certain special functions, usually faster than CPU 102 could perform them in software. Coprocessor 112 may comprise, but is not limited to, a floating point coprocessor, a GPU, a networking coprocessor, and other types of coprocessors and processors as would be apparent to a person skilled in the relevant art(s).

System 100 further includes a first local memory 106 and a second local memory 108. First local memory 106 is coupled to GPU 110 and also coupled to bus 114. Second local memory 108 is coupled to coprocessor 112 and also coupled to bus 114. First and second local memories 106 and 108 are available to GPU 110 and coprocessor 112 respectively in order to provide faster access to certain data (such as data that is frequently used) than would be possible if the data were stored in system memory 104.

In an embodiment, GPU 110 and coprocessor 112 decode instructions in parallel with CPU 102 and execute only those instructions intended for them. In another embodiment, CPU 102 sends instructions intended for GPU 110 and coprocessor 112 to respective command buffers.

Figure 2:
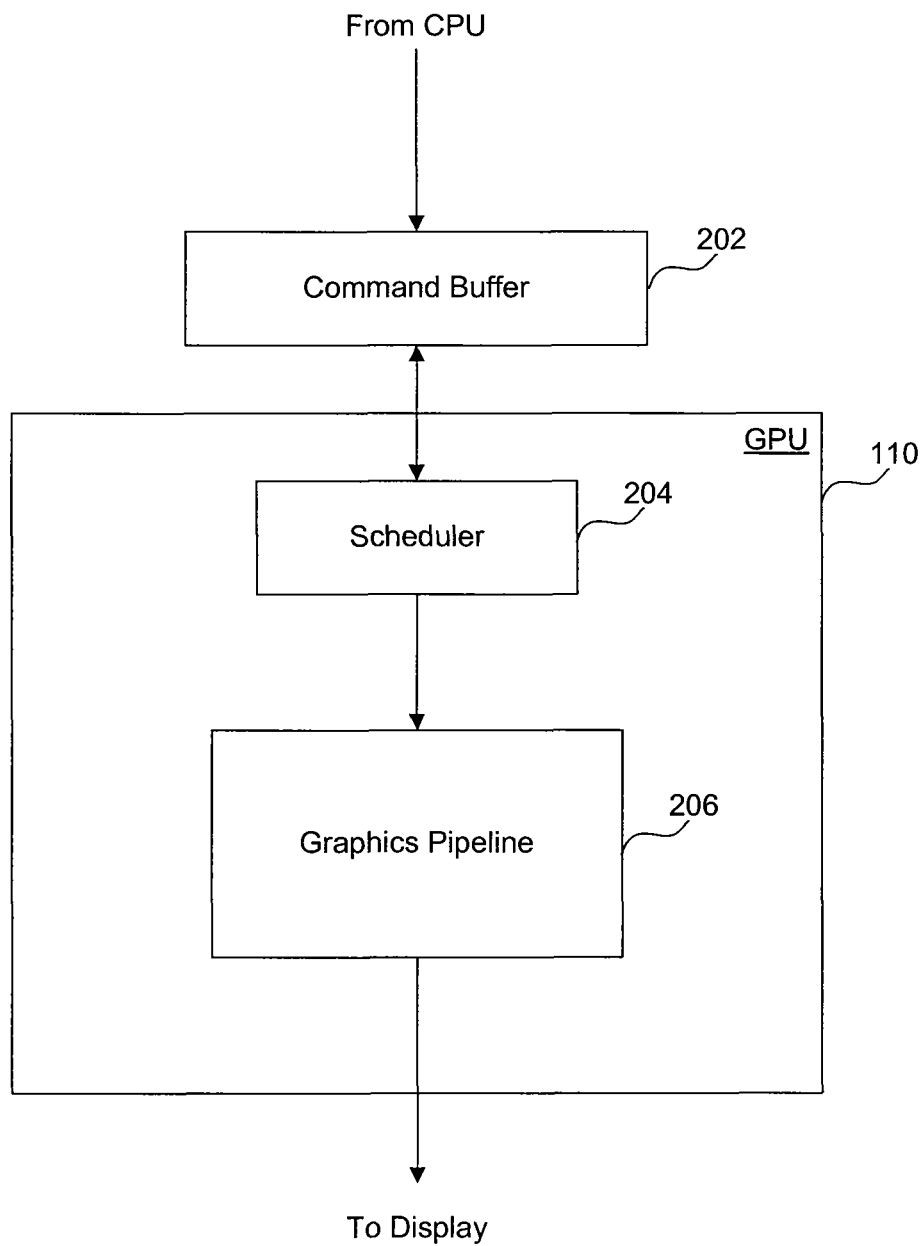
FIG. 2 depicts a block diagram illustrating features of the GPU of FIG. 1.

For example, FIG. 2 depicts a block diagram illustrating an embodiment in which CPU 102 sends instructions intended for GPU 110 to a command buffer 202. Command buffer 202 may be located, for example, in system memory 104 or may be a separate memory coupled to bus 114. As illustrated in FIG. 2, GPU 110 includes a scheduler 204 and a graphics pipeline 206. Scheduler 204 retrieves instructions from command buffer 202. Scheduler 204 forwards the instructions to a command processor within graphics pipeline 206, as described in more detail below.

B. An Example Graphics Pipeline

Figure 3:
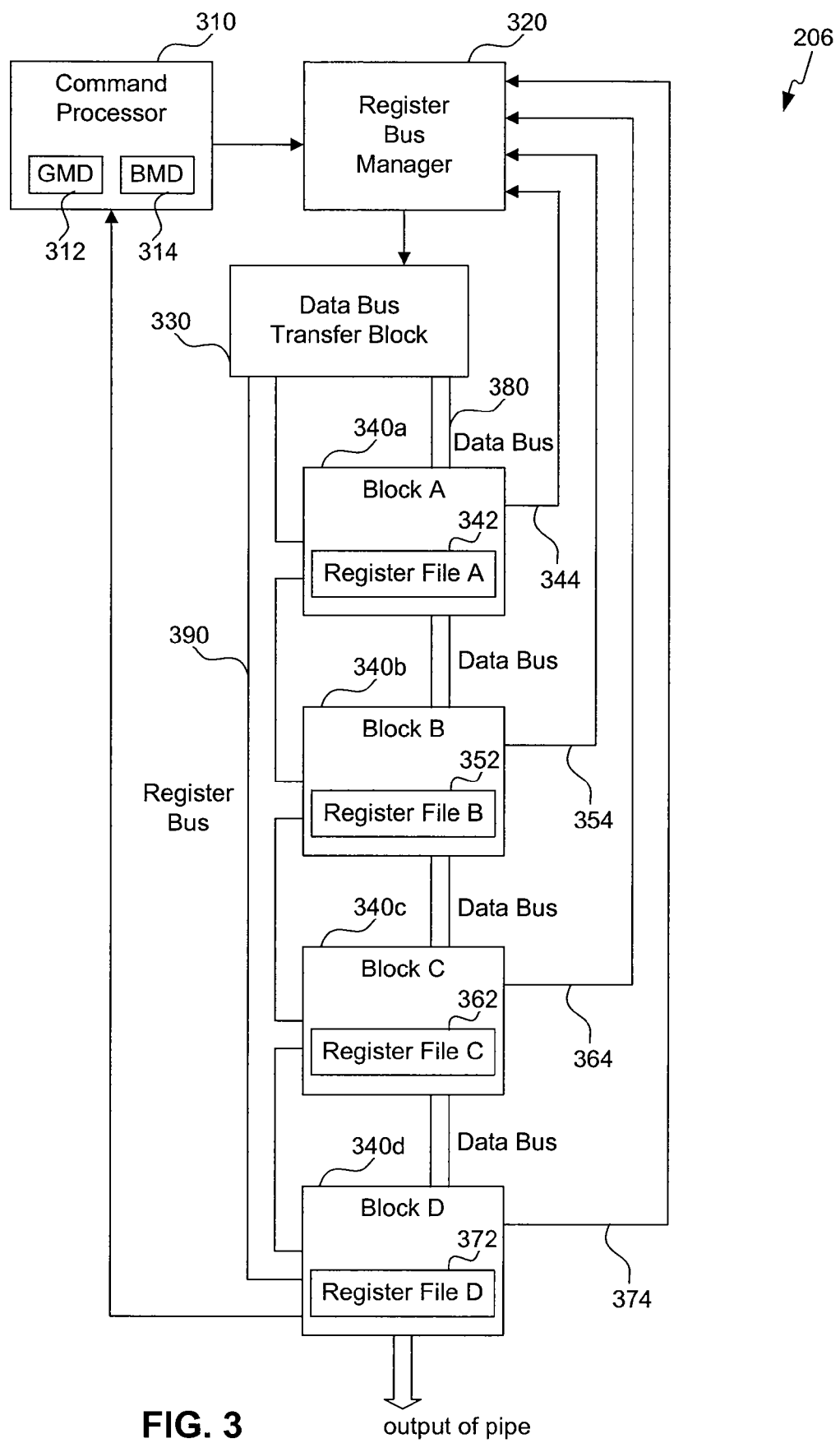
FIG. 3 depicts a block diagram illustrating details of a graphics pipeline included in the GPU of FIG. 1.

FIG. 3 depicts a block diagram illustrating details of graphics pipeline 206 in accordance with an embodiment of the present invention. As shown in FIG. 3, graphics pipeline 206 includes a command processor (CP) 310, a register bus manager (RBM) 320, a data bus transfer (DBT) block 330, a block A 340a, a block B 340b, a block C 340c, and a block D 340d. Each of these elements is described in more detail below.

CP 310 receives commands in a command stream, for example, from scheduler 204. The commands include draw commands, global state updates, and block state updates. In an embodiment, each command includes a register address. In this embodiment, a command can be parsed as a draw command, a global state update, or a block state update based on whether the address included in the command falls within a predetermined address range. The invention, however, is not limited to this embodiment. A person skilled in the relevant art(s) will appreciate that other mechanisms for parsing commands can be used without deviating from the spirit and scope of the present invention.

CP 310 also maintains two dirty bits: (1) a globally managed dirty (GMD) bit 312 to indicate whether a global state update has been received; and (2) a block managed dirty (BMD) bit 314 to indicate whether a block state update has been received. GMD bit 312 and BMD bit 314 power up dirty (set), for example, by powering up as logical ones. Both of these bits are cleared by a draw command.

CP 310 also manages the number of global states written to registers of blocks 340 of graphics pipeline 206. To manage the number of global states, CP 310 manages a global state identification (ID) that indicates the global state of graphics pipeline 206. The global state ID ranges from zero to a maximum number of global states sustained by graphics pipeline 206, such as, for example, eight global states. When GPU 110 is powered up, the global state ID is set at zero. As described in more detail below, the global state ID is incremented after a global context event is received and a new global state is written to graphics pipeline 206. A global state ID is released (and may then be re-used) after a last block in graphics pipeline 206 (e.g., block D 340d) sends a pulse back to CP 310. For example, CP 310 may increment the global state ID from 0 to 1, but global state ID 0 cannot be re-used until the last block sends a pulse back to CP 310 indicating that the context corresponding to global state ID 0 has completed.

CP 310 is coupled to RBM 320. CP 310 writes the draw commands, global state updates and block state updates to RBM 320. As described in more detail below, the number of global states allocated to graphics pipeline 206 is managed by CP 310.

RBM 320 is coupled to DBT block 330. RBM 320 writes the draw commands, global state updates and block state updates to DBT block 330. As described in more detail below, the number of block states allocated to graphics pipeline 206 is collectively managed by RBM 320 and the respective blocks 340.

DBT block 330 is coupled to block A 340a, block B 340b, block C 340c, and block D 340d via a data bus 380 and a register bus (control bus) 390. Data bus 380 provides an input (data) stream to blocks 340. Block A 340a through block D 340d are coupled to data bus 380 in a daisy chain manner. In other words, block A 340a executes processes on the data in the input stream and then sends the data to block B 340b; block B 340b executes processes on the data in the input stream and then sends the data to block C 340c; block C 340c executes processes on the data in the input stream and then sends the data to block D 340d; and block D 340d executes processes on the data in the input stream and then outputs that data as the output of graphics pipeline 206. After block D 340d executes processes on the data for a given global context, block D 340d sends a pulse back to CP 310 to indicate that the global state ID associated with the given global context can be re-allocated. In addition to providing an input (data) stream, data bus 380 provides global context events and block context events to blocks 340. In an embodiment, data bus 380 is one hundred bits wide.

Register bus 390 provides commands to blocks 340, including draw commands, global state updates and block state updates. A draw command instructs blocks 340 to execute a draw on the data received from data bus 380 based on the global state and block state(s) allocated for that draw command.

Global state updates are written to local registers maintained by the respective blocks. As illustrated in FIG. 3, block A 340a writes the global state updates to registers in register file A 342; block B 340b writes the global state updates to registers in register file B 352; block C 340c writes the global state updates to registers in register file C 362; and block D 340d writes the global state updates to registers in register file D 372.

Block state updates are only written to a particular block or blocks in graphics pipeline 206. For example, a block state update on register bus 390 may be intended only for block B 340b. In this example, only block B 340b would write the block state update to a register in register file B 352. All the other blocks would not write this block state update to a register in their respectively maintained local register files. In an embodiment, a block state update comprises an address. In this embodiment, each block 340 determines whether it should write this block state update to its local register file based on the address of the block state update. However, a person skilled in the relevant art(s) will appreciate that other mechanisms for determining whether a particular block should write a block state update to its local register(s) can be used without deviating from the spirit and scope of the present invention.

Given the structure of graphics pipeline 206, its operation is now described in more detail below.

III. Example Operation of an Efficient State Management System

As mentioned above, graphics pipeline 206 independently manages global state updates and block state updates, thereby enabling graphics pipeline 206 to execute draw commands based on a relatively large number of different draw constants. First, an overview of global managed states and block managed states is presented. Then, there is presented an example manner for limiting the number of global states and block states allocated to graphics pipeline 206. Finally, an example sequence of events are presented to illustrate the operation of an efficient state management system in accordance with an embodiment of the present invention.

A. Global and Block Managed State Transitions

CP 310 manages global state updates. If CP 310 detects a global-state update in the command stream and if there are global-state registers available to be written in graphics pipeline 206, CP 310 will perform the following functions:

(i) set GMD bit 312 (if it is not already set);
(ii) send a global context event (namely, "Global_Context_Done") to RBM 320, which provides the global context event on data bus 380;
(iii) increment the global-state ID bit;
(iv) write to a GBL COPY STATE register in CP 310; and
(v) send the global-state update to RBM 320, which provides the global-state update on register bus 390.

If, however, CP 310 detects a global-state update in the command stream, but there are no available global-state registers in graphics pipeline 206, the write to the GBL_COPY_STATE register stalls until a context is available. GMD bit 312 is used to indicate a context has already been rolled for this set of state.

If BMD bit 314 is not set and CP 310 detects a block-state update in the command stream, it will set BMD bit 314, send the Block_Context_Done event followed by the block-state updates. The dirty bits maintained by CP 310 and individual blocks 340 are set to indicate a context has already been rolled for this set of state. If there are no available block-state registers to use, the target block (e.g., block B 340b) is responsible for not returning free if the target block (e.g., block B 340b) can accept no more register updates.

The operation of global and block managed state transitions is further illustrated by the example sequence of events provided in section III.C.

B. Managing The Number of Global States and Block States Allocated to a Graphics Pipeline in Accordance With an Embodiment of the Present Invention The number of global states allocated to graphics pipeline 206 is managed by CP 310, whereas the number of block states allocated to graphics pipeline 206 is collectively managed by RBM 320 and the respective blocks 340. The mechanisms for managing the number of global states and blocks states are now described in more detail.

CP 310 continually writes draw commands and block state updates to RBM 320. However, CP 310 only writes global state updates to RBM 320 if the number of global states allocated is less than the maximum number of global states sustained by graphics pipeline 206. That is, the number of global states allocated to graphics pipeline 206 is managed by CP 310.

RBM 320 continually writes draw commands and global state updates to DBT block 330. However, RBM 320 only writes block state updates to DBT 320 if the number of block states allocated is less than the maximum number of block states sustained by blocks 340 of graphics pipeline 206. DBT block 330 determines whether the number of block states is less than the maximum number based on signals received from blocks 340. That is, RBM 320 and the respective blocks 340 manage the number of block state updates allocated to graphics pipeline 206.

As mentioned above, RBM 320 and blocks 340 collectively function to throttle the number of block state updates written to graphics pipeline 206. As illustrated in FIG. 3, blocks 340 respectively connect to RBM 320 via trace 344, trace 354, trace 364, and trace 374. As long as the number of block states allocated to the blocks is less than the maximum number of block states for each block, RBM 320 writes block state updates to DBT block 330, which in turn writes the block state updates to register bus 390. If, however, the number of block updates to one of blocks 340 reaches the maximum number of block states for that block, that block does not return a "free" signal to RBM 320. As a result, RBM 320 stalls until a previously issued draw command completes execution and the block state(s) allocated to that draw command are de-allocated.

C. An Example Sequence of Events

FIG. 4 depicts a table 400 illustrating how graphics pipeline 206 responds to an example sequence of events. As shown in FIG. 4, table 400 includes eight columns. A first column 410 includes line numbers enumerating the sequence of events received. A second column 420 includes example events received by CP 310 and written to register bus 390. A third column 430 includes the input (data) stream provided on data bus 380. A fourth column 440 indicates the state of GMD bit 312 of CP 310. A fifth column 450 includes the state of BMD bit 314 of CP 310. A sixth column 460 includes a global state ID, which indicates the global state of graphics pipeline 206. A seventh column 470 indicates a state of a block dirty bit and a block context indicator bit of block A 340a. And, an eighth column 480 indicates a block state ID of block A 340a. Seventh column 470 and eighth column 480 illustrate how block A 340a responds to the example sequence of events. A person skilled in the relevant art(s) will understand that block B 430b, block C 430c, and block D 430d operate in a similar manner to block A 340a. The sequence of events enumerated by the line numbers in first column 410 are now described in more detail below.

Referring to first column 410 of table 400, line 1 illustrates that GMD bit 312 and BMD bit 314 are powered up dirty (e.g., logical one) as depicted in fourth and fifth columns 440 and 450, respectively. In addition, seventh column 470 illustrates that the dirty bit of block A 340a is also powered up dirty (e.g., logical one). In lines 2 and 3, a block state and a global state are respectively received. These state writes do not cause any change in state.

In line 4, a Draw_Initiator_in_Context_(Ctx)_0 command is received. This draw command clears GMD bit 312, BMD bit 314, and the dirty bit managed by block A 340a as illustrated in fourth column 440, fifth column 450, and seventh column 470, respectively. The draw command is executed on data provided on data bus 380. Third column 430 indicates that this data includes vertex/pixel vectors.

In line 5, a Global_Context_Done command is received. This command indicates that global context 0 has completed. As a result, the Ctx Done Event is provided on data bus 380 to instruct blocks 340 in graphics pipeline 206 that global context 0 has completed. In an embodiment, the Ctx_Done_Event is a data packet.

In line 6, a Write GBL_COPY_STATE command is received. This command indicates that a new global state is to be written to the registers of graphics pipeline 206. As a result of this command, GMD bit 312 is set as indicated in fourth column 440. In addition, as indicated in sixth column 460, the global state ID bit is incremented to 1 to indicate that graphics pipeline 206 is entering a new global state.

In line 7, the Global State update corresponding to global context 1 is received and written to the registers of graphics pipeline 206.

In line 8, a Draw_Initiator_in_Ctx_1 command is received. This draw command clears the only dirty bit that was previously set—namely, GMD bit 312 as illustrated in fourth column 440. Similar to the Draw_Initiator_in_Ctx_0 received in line 4, the Draw_Initiator_in_Ctx_1 command is executed on vertex/pixel vectors carried on data bus 380.

In line 9, a Block_Context_Done event is received. This command indicates that one of the block contexts has been completed. As a result, BMD bit 314 is set (as illustrated in fifth column 450) and a block context event (Blk_Ctx_Done_Event) is provided on data bus 380. As indicated in seventh column 470, block A 340a detects this event, but does not initially set its dirty bit. Block A 340a does not initially set its dirty bit because it is not yet determined whether this block event corresponds to block A 340a. This block event could correspond to any of blocks 340 in graphics pipeline 206.

In line 10, a Block_State_(Includes BlkA State) command is received, which indicates that this block event corresponds to block A 340a. As a result, block A 340a sets its dirty bit and increments its state ID, as indicated in seventh column 470 and eighth column 480, respectively. As mentioned above, in an embodiment, the commands in the command stream comprises addresses and block A 340a determines that the Block_State should be written to a register in register file A 342 because the address of the Block_State falls with a predetermined an address range corresponding to block A 340a.

In line 11, a Global_Context_Done command is received. This command indicates that global context 1 has completed. As a result, a global context event (Ctx Done Event) is provided on data bus 380 to instruct blocks 340 in graphics pipeline 206 that global context 1 has completed.

In line 12, a Write GBL_COPY_STATE command is received. Similar to the Write GBL_COPY_STATE command received in line 6, the command received in line 12 indicates that a new global state is to be written to the registers of graphics pipeline 206. As a result of this command, GMD bit 312 is set as indicated in fourth column 440. In addition, as indicated in sixth column 460, the global state ID bit is incremented to 2 to indicate that graphics pipeline 206 is entering a new global state.

In line 13, the Global State update corresponding to global context 2 is received and written to the registers of graphics pipeline 206.

In line 14, a Draw_Initiator_in_Ctx_2 command is received. This draw command clears the dirty bits that were previously set—namely, GMD bit 312, BMD bit 314, and the dirty bit managed by block A 340a as illustrated in fourth column 440, fifth column 450, and seventh column 470, respectively. Similar to the Draw_Initiator_in_Ctx_0 received in line 4 and the Draw_Initiator_in_Ctx_1 received in line 8, the Draw_Initiator_in_Ctx_2 command is executed on vertex/pixel vectors provided on data bus 380.

In line 15, a Block_Context_Done event is received. This command indicates that one of the block contexts has been completed. As a result, BMD bit 314 is set (as illustrated in fifth column 450) and a block context event (Blk_Ctx_Done_Event) is written to data bus 380. As indicated in seventh column 470, block A 340a detects this event, but does not initially set its dirty bit.

In line 16, a Block_State (Not a BlkA State) command is received, which indicates that this block event does not correspond to block A 340a. As a result, block A 340a does not set its dirty bit, nor does it increments its state ID, as indicated in seventh column 470 and eighth column 480, respectively. In an embodiment, block A 340a determines that this Block_State should not be written to a register in register file A 342 because the address of this Block_State does not fall within a predetermined address range corresponding to block A 340a.

In line 17, another Draw_Initiator_in_Ctx_2 command is received. This draw command clears the dirty bits that were previously set—namely, GMD bit 312, BMD bit 314, and the dirty bit managed by block A 340a as illustrated in fourth column 440, fifth column 450, and seventh column 470, respectively. Similar to the other Draw_Initiator commands that were previously received, this Draw_Initiator_in_Ctx_2 command is executed on vertex/pixel vectors carried on data bus 380.

Additional events are received and processed in a manner similar to that described above. It is to be appreciated that the example sequence of events presented above is for illustrative purposes only, and not limitation.

IV. Example Software Implementations of an Efficient State Management System

In addition to hardware implementations of GPU 110, GPU 110 may also be embodied in software disposed, for example, in a computer usable (e.g., readable) medium configured to store the software (such as, for example, a computer readable program code). The program code causes the enablement of embodiments of the present invention, including the following embodiments: (i) the functions of the systems and techniques disclosed herein (such as managing global state updates and block state updates); (ii) the fabrication of the systems and techniques disclosed herein (such as the fabrication of GPU 110); or (iii) a combination of the functions and fabrication of the systems and techniques disclosed herein. For example, this can be accomplished through the use of general programming languages (such as C or C++), hardware description languages (HDL) including Verilog HDL, VHDL, Altera HDL (AHDL) and so on, or other available programming and/or schematic capture tools (such as circuit capture tools).

The program code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

V. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computer-based system for executing state-dependent processes, the computer-based system comprising:
    a command processor configured to receive one or more commands in a command stream and to manage one or more global states responsive to one or more global context events in the command stream;
    a plurality of processing blocks configured to receive the one or more commands in the command stream and to manage respective block states responsive to one or more block context events in the command stream, wherein each respective processing block executes a process on data in a data stream based on the one or more global states and the block states of the respective processing block; and
    an interface block configured to manage a counter for at least one processing block, wherein the counter includes a block state value indicative of the number of block states stored in the at least one processing block, and configured to stall the one or more commands in the command stream when the block state value exceeds a threshold.

2. The computer-based system of claim 1, wherein a first processing block of the plurality of processing blocks is configured to manage a first number of block states and a second processing block of the plurality of processing blocks is configured to manage a second number of block states, and wherein the first number is not equal to the second number.

3. The computer-based system of claim 1, wherein the command processor is configured to manage a global state counter with a global state value indicative of the number of the one or more global states and to stall the one or more commands in the command stream when the global state value exceeds a threshold.

4. The computer-based system of claim 1, wherein the command processor is configured to reallocate a first one of the one or more global states after receiving a free signal from a last processing block in the plurality of processing blocks.

5. A method for executing state-dependent processes in an application-specific integrated circuit (ASIC), the method comprising:
    managing one or more global states of the ASIC responsive to one or more global context events in a command stream;
    managing block states of each processing block in a plurality of processing blocks responsive to one or more block context events in the command stream;
    executing a process on data in a data stream in each respective processing block of the plurality of processing blocks based on the one or more global states and the block states of the respective processing block; and
    stalling one or more commands in the command stream when at least one of a global state value indicative of the number of the one or more global states exceeds a first threshold, a block state value indicative of the number of block states exceeds a second threshold, or a combination thereof.

6. The method of claim 5, wherein the managing the block states comprises managing a first number of block states in a first processing block of the plurality of processing blocks and a second number of block states in a second processing block of the plurality of processing blocks, wherein the first number is not equal to the second number.

7. The method of claim 5, wherein the managing the one or more global states comprises reallocating a first one of the one or more global states after receiving a free signal from a last processing block in the plurality of processing blocks.

8. A non-transitory computer usable medium that includes an application-specific integrated circuit (ASIC) embodied in software, wherein the ASIC executes state-dependent processes, the ASIC comprising:
    a command processor configured to receive one or more commands in a command stream and to manage one or more global states responsive to one or more global context events in the command stream;
    a plurality of processing blocks configured to receive the one or more commands in the command stream and to manage respective block states responsive to one or more block context events in the command stream, wherein each respective processing block executes a process on data in a data stream based on the one or more global states and the block states of the respective processing block; and
    an interface block configured to manage a counter for at least one processing block, wherein the counter includes a block state value indicative of the number of block states stored in the at least one processing block, and configured to stall the one or more commands in the command stream when the block state value exceeds a threshold.

9. The non-transitory computer usable medium of claim 8, wherein a first processing block of the plurality of processing blocks is configured to manage a first number of block states and a second processing block of the plurality of processing blocks is configured to manage a second number of block states, and wherein the first number is not equal to the second number.

10. The non-transitory computer usable medium of claim 8, wherein the command processor is configured to manage a global state counter with a global state value indicative of the number of the one or more global states and to stall the one or more commands in the command stream when the global state value exceeds a threshold.

11. The non-transitory computer usable medium of claim 8, wherein the command processor is configured to reallocate a first one of the one or more global states after receiving a free signal from a last processing block in the plurality of processing blocks.

12. The non-transitory computer usable medium of claim 8, wherein the ASIC is embodied in hardware description language software.

13. The non-transitory computer usable medium of claim 8, wherein the ASIC is embodied in one of Verilog hardware description language software and VHDL hardware description language software.

14. The computer-based system of claim 1, wherein the command processor provides one or more global state updates to the interface block when the number of the one or more global states is less than another threshold.

15. The computer-based system of claim 1, further comprising:

a data bus transfer block configured to receive the one or more global states from the command processor via the interface block.

16. The computer-based system of claim 15, wherein the interface block is configured to provide one or more block state updates to the data bus transfer block when a number of the one or more block states is less than the threshold.

17. The computer-based system of claim 1, wherein each of the plurality of processing blocks is coupled to a register bus and the plurality of processing blocks is sequentially coupled to a data bus in a daisy-chain configuration.

18. The computer-based system of claim 1, wherein the at least one processing block comprises a single processing block.

19. The computer-based system of claim 1, wherein the at least one processing block comprises a plurality of processing blocks.

20. The method of claim 5, wherein the stalling comprises completing a prior process on the data in the data stream in each respective processing block of the plurality of processing blocks prior to executing the one or more commands in the command stream.

\* \* \* \* \*